(12) United States Patent
Wagner et al.

(10) Patent No.: US 8,111,064 B2
(45) Date of Patent: Feb. 7, 2012

(54) MAGNETIC ROTATIONAL ANGLE TRANSDUCER

(75) Inventors: Matthias Wagner, Neu Isenburg (DE); Peter Wiese, Kelkheim (DE)

(73) Assignee: Continental Automotive GmbH, Hannover (DE)

( * ) Notice: Subject to any disclaimer, the term of this patent is extended or adjusted under 35 U.S.C. 154(b) by 336 days.

(21) Appl. No.: 12/297,502

(22) PCT Filed: Mar. 26, 2007

(86) PCT No.: PCT/EP2007/052865
§ 371 (c)(1),
(2), (4) Date: Oct. 17, 2008

(87) PCT Pub. No.: WO2007/122055
PCT Pub. Date: Nov. 1, 2007

(65) Prior Publication Data
US 2010/0060267 A1    Mar. 11, 2010

(30) Foreign Application Priority Data

Apr. 21, 2006    (DE) .......................... 10 2006 018 627

(51) Int. Cl.
*G01B 7/30*    (2006.01)
(52) U.S. Cl. ................. 324/207.25; 324/207.2
(58) Field of Classification Search .................. None
See application file for complete search history.

(56) References Cited

U.S. PATENT DOCUMENTS

| | | | |
|---|---|---|---|
| 6,396,260 B1 | 5/2002 | Reichl et al. | 324/207.25 |
| 6,646,435 B1 | 11/2003 | Nakamura et al. | 324/207.25 |
| 7,023,202 B2 | 4/2006 | Hagino et al. | 324/207.25 |
| 7,378,838 B2 * | 5/2008 | Mizutani et al. | 324/207.2 |
| 2004/0251896 A1* | 12/2004 | Mizutani et al. | 324/207.25 |
| 2007/0164734 A1* | 7/2007 | Shimizu et al. | 324/207.25 |

FOREIGN PATENT DOCUMENTS

| | | |
|---|---|---|
| DE | 197 31 555 A1 | 4/1998 |
| DE | 197 53 776 A1 | 6/1999 |
| EP | 0 665 416 B1 | 1/1995 |
| EP | 1 069 400 B1 | 1/2001 |
| EP | 1 467 184 A1 | 10/2004 |
| EP | 1 503 183 A1 | 2/2005 |
| JP | 05231879 A * | 9/1993 |
| JP | 2006194684 A * | 7/2006 |
| WO | WO 99/30112 A1 | 7/1999 |

* cited by examiner

*Primary Examiner* — Paresh Patel
(74) *Attorney, Agent, or Firm* — King & Spalding LLP

(57) ABSTRACT

A magnetic rotational angle transducer has at least one Hall sensor (14) rotatable in a magnetic field of a given configuration relative to and offset from the rotational axis (16). To enable linearization of the output signal without additional signal processing over a large range of rotational angles, it is proposed that the Hall sensor is aligned radially and axially to the rotational axis (16) and lies in a central position parallel to the field lines of the magnetic field, wherein the magnetic field is created by at least one permanent magnet (18) in circular segment form around the rotation axis and the Hall sensor (14) is offset from the rotational axis (16) towards the permanent magnet (18) in circular segment form.

13 Claims, 5 Drawing Sheets

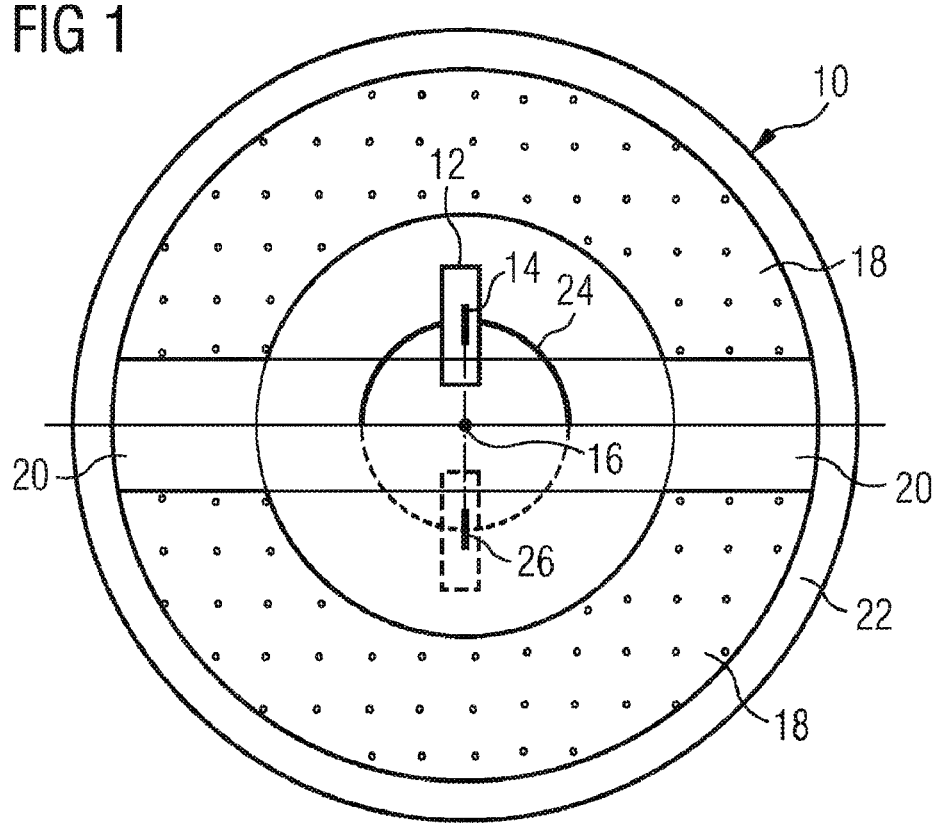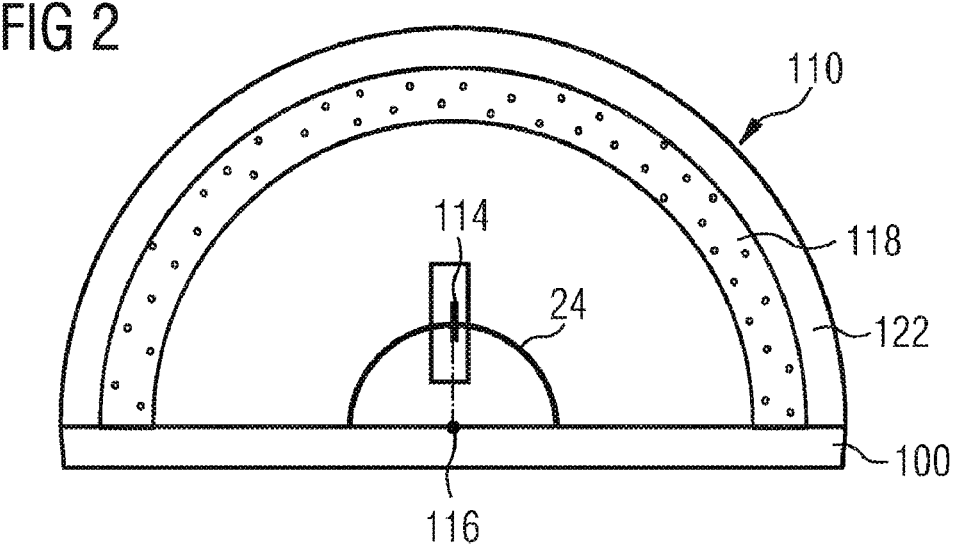

FIG 3
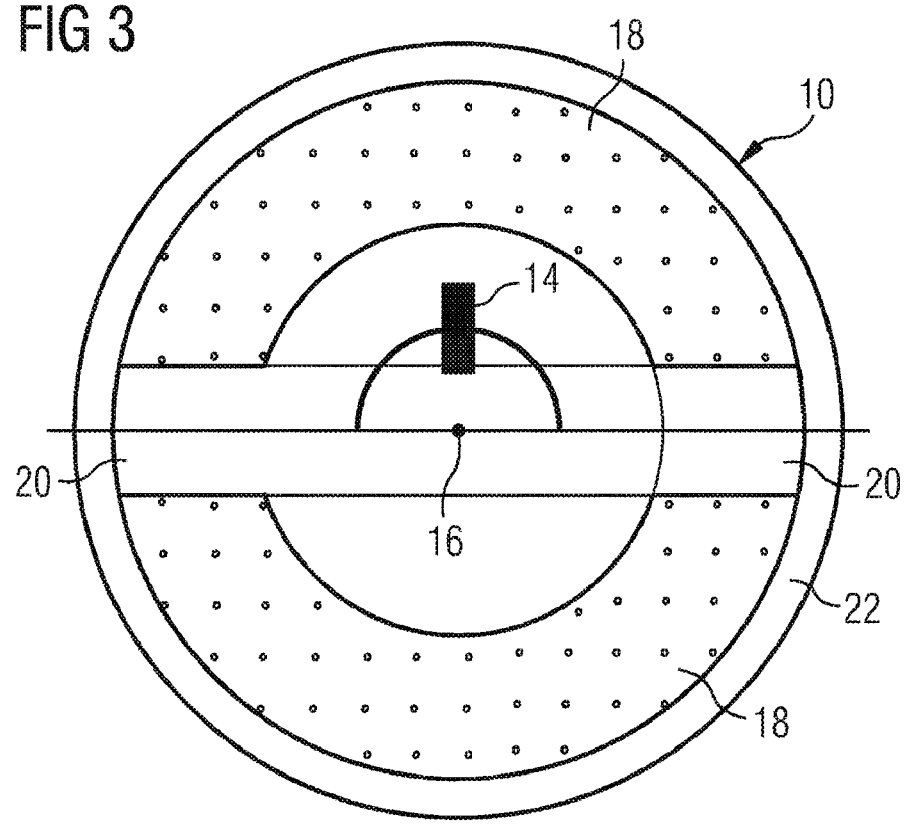
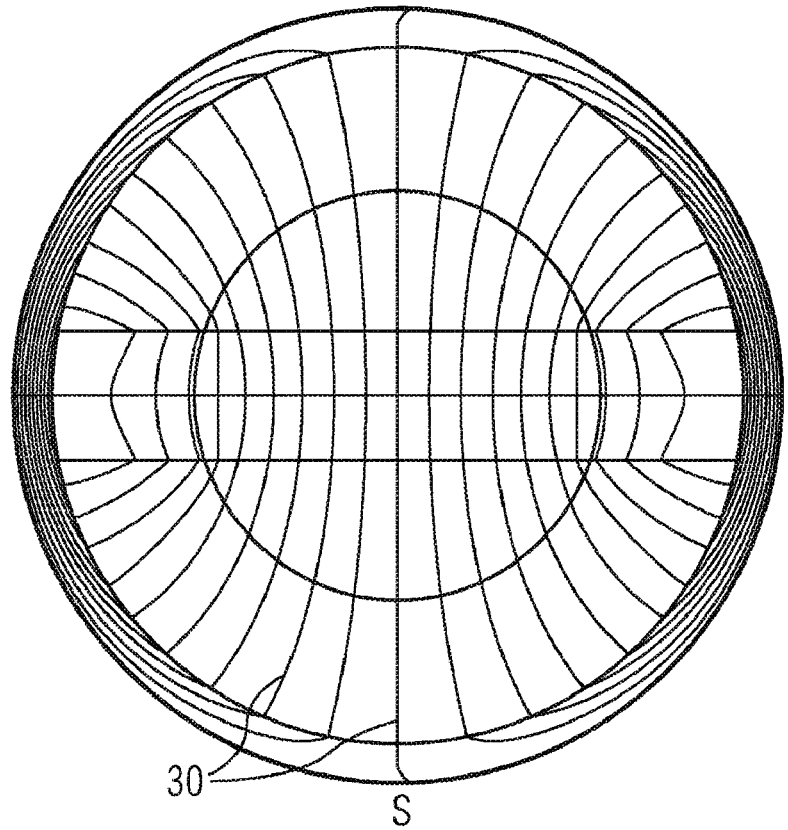

FIG 4
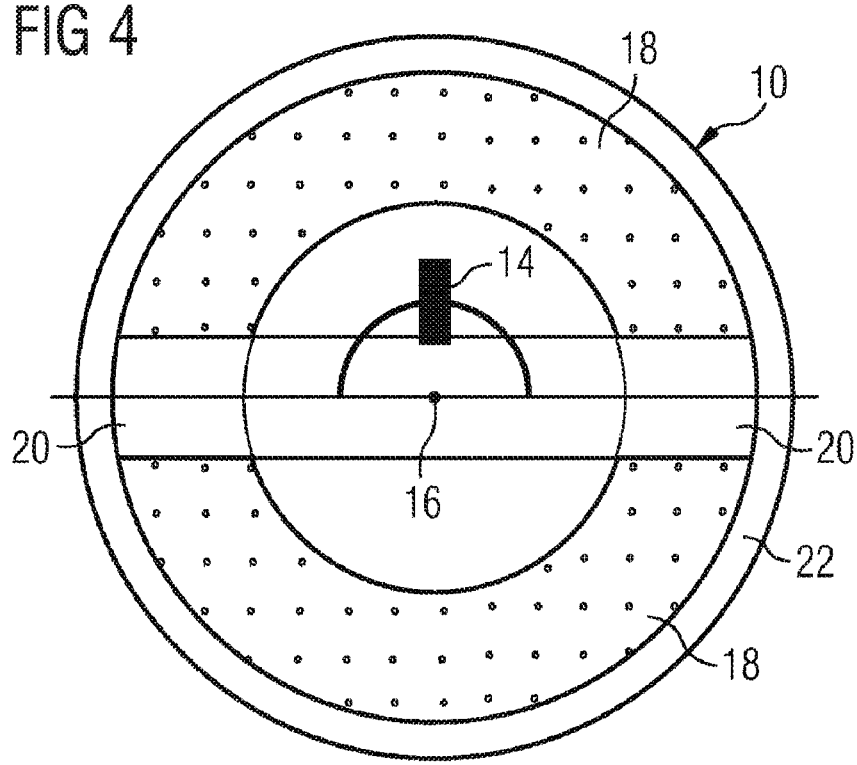
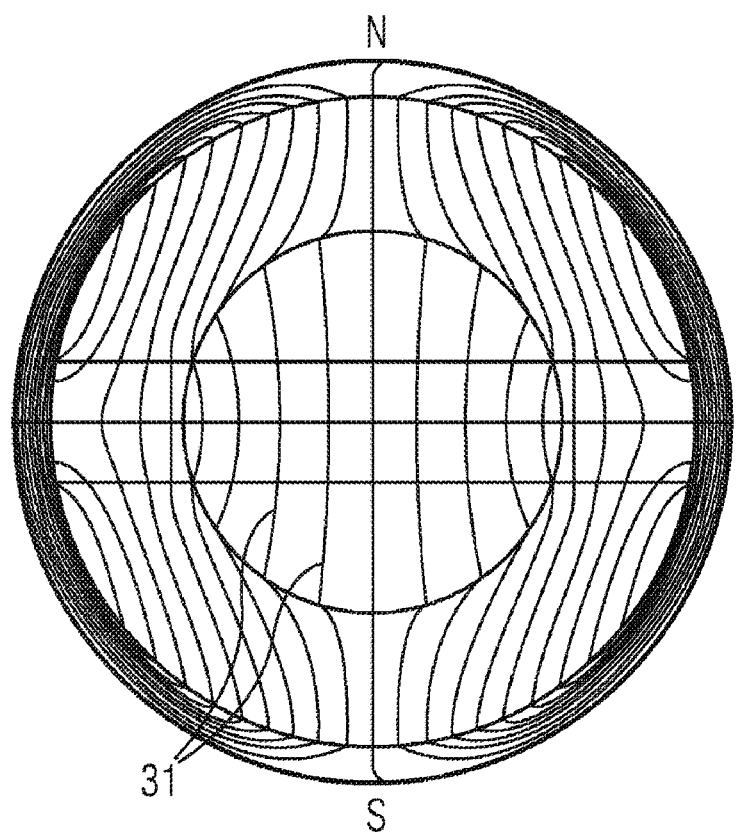

α=20°

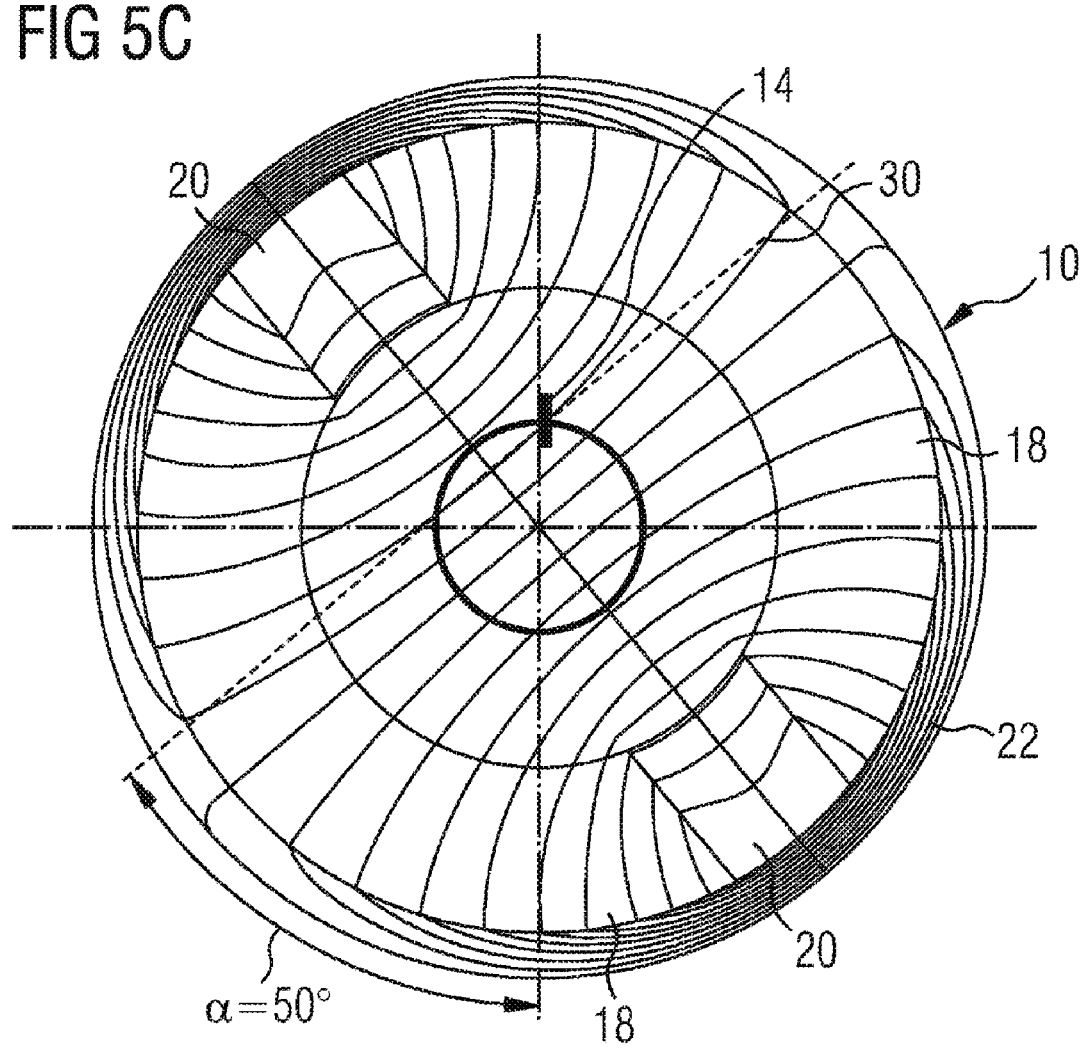

MAGNETIC ROTATIONAL ANGLE TRANSDUCER

CROSS-REFERENCE TO RELATED APPLICATIONS

This application is a U.S. National Stage Application of International Application No. PCT/EP2007/052865 filed Mar. 26, 2007, which designates the United States of America, and claims priority to German Application No. 10 2006 018 627.3 filed Apr. 21, 2006, the contents of which are hereby incorporated by reference in their entirety.

TECHNICAL FIELD

The present invention is concerned with a magnetic rotational angle transducer, having a magnetic field with a specific configuration and at least one Hall sensor which can rotate relative to one another, wherein the Hall sensor is arranged offset with respect to the rotational axis.

BACKGROUND

In many applications it is necessary to use a rotational angle transducer to obtain information about the absolute angular position of a shaft, and in some cases in this context the information must in turn be available directly after a system is switched on. An example of such an application is, for example, the throttle valve shaft of a motor vehicle in which the use of an incremental position sensor is becoming widespread since such a sensor has to carry out reference travel when the system starts and in this context it moves against a mechanical end position. In the case of a throttle valve shaft, this would lead, in one of the end positions, to the engine stalling, and in the other end position to an open throttle position of the throttle valve when the engine has already started. Reference travel before the starting of the engine would lead to a time delay which is not accepted by the customer. Incremental position sensors are also not optimal for safety considerations because there is the risk that during operation faults on the lines, such as can occur for example due to the ignition, can result in a movement of the monitored shaft being simulated, which can lead to considerable functional problems.

The previously mentioned objections relate, for example, to the throttle valve shaft of a motor vehicle which has already been mentioned. In such a throttle valve shaft, for example what are referred to as magneto-resistive sensors (see for example DE 197 31 555 A1) or sensors which operate with inductive methods are used. Basically, although these are suitable for meeting the requirements, the manufacturing costs are at a relatively high level, in particular also because complex digital signal processing is necessary to linearize the output signals of the sensors. A known permanent-magnetic sensor is also the analogue Hall sensor. In such a sensor the signal conditioning is considerably simpler, and with skillful configuration there is even no need at all for digital signal processing. However, the interaction of a Hall sensor with a magnetic field is subject to disadvantages because the linear measuring range of a Hall sensor is not sufficient for simple magnetic circuits. The output signal of a Hall sensor which is rotated in a magnetic field with parallel orientation of the field lines correspondingly follows the projection of the field onto the sensitive face of the Hall element of a sinusoidal curve, with the result that given perpendicular orientation of the field with respect to the Hall plane the maximum signal is generated and the gradient at this point is, however, equal to zero so that this characteristic curve range is virtually unusable. Without complex signal processing with a sinusoidal curve, a sufficiently linear profile is obtained only in a range of +/−20° around the zero crossover, while, for example, for the sensing of the throttle valve position a measuring range of >90° is required so that a linear range of at least +/−45° around the zero crossover would be necessary.

A solution of the problem which operates satisfactorily but is at the same time very costly is to linearize the flux profile using iron circuits (see, for example, EP 0 665 416 B1). However, due to the expenditure incurred for the iron circuits the cost advantage of the Hall sensor compared to the principles mentioned at the beginning is for the most part lost again, especially since it is necessary to use for the magnets materials composed of rare earths, for example samarium cobalt, which are very expensive magnetic substances. In addition, it is necessary to take into account the fact that a material with a very low coercivity has to be used for the flux conducting components in order to avoid hysteresis effects when the directions of movement change.

A solution of the type described at the beginning is known from EP 1 069 400 B1. In said document, an output signal, linearized in a relatively large angular range, of a Hall sensor whose surface is located radially and perpendicularly with respect to the rotational axis is obtained through selective influencing of the magnetic field. A problem with such a rotational angle transducer is that positional deviations of the sensor with respect to the magnetic field can influence the signal output in an undesired way, with the result that when mounting the sensor it is necessary to ensure that the Hall sensor is positioned particularly precisely within the magnetic field, and this is not always readily the case, for example when assembling a throttle valve housing. In addition, two redundant channels with as far as possible an identical signal output are often required, and said channels cannot be readily implemented in the solution described in EP 1 069 400 B1 since when two measuring pickups are arranged next to one another there is inevitably a phase offset between the output signals of the Hall sensors.

SUMMARY

A permanent-magnetic rotational angle transducer can be provided which permits linearization of the output signal of the Hall sensor over a large rotational angle range without extensive signal conditioning, and which is insensitive to positional deviations of the sensor in the axial and radial directions with respect to the rotational axis.

According to an embodiment, a magnetic rotational angle transducer, may comprise at least one Hall sensor which can rotate around a rotational axis, wherein the Hall sensor is arranged offset with respect to the rotational axis, at least one circular segment-shaped permanent magnet arranged around the rotational axis for forming a magnetic field with a specific configuration, wherein two main directions of the at least one Hall sensor are located radially and axially with respect to the rotational axis and in a central position parallel to field lines of the magnetic field in this central position, and wherein the Hall sensor is arranged offset from the rotational axis toward the circular segment-shaped permanent magnet.

According to a further embodiment, the magnetic field may be formed mirror-symmetrically around a mirror plane which is located parallel to the field lines in the central position of the Hall sensor. According to a further embodiment, the magnetic field can be embodied so as to be axially symmetric about the rotational axis. According to a further embodiment, the magnetic field can be formed by two maximum semicircular permanent magnets which are arranged mirror-symmetrically with respect to one another or by a solid ring-shaped permanent magnet. According to a further embodiment, the mirror plane of the two permanent magnets may run through the rotational axis perpendicularly with respect to the sensor face of the Hall sensor in the central position. According to a further embodiment, in each case a gap can be formed between the two ends of the two circular segment-shaped permanent magnets. According to a further embodiment, the walls of the gaps can be located parallel to one another. According to a further embodiment, the first Hall sensor can be offset from the rotational axis toward the first circular segment-shaped permanent magnet, and a second Hall sensor can be arranged mirror-symmetrically with respect to the first Hall sensor, offset from the rotational axis toward the second circular segment-shaped permanent magnet. According to a further embodiment, a circular segment-shaped permanent magnet can be replaced by a short-circuit plane made of ferromagnetic material which extend as far as the rotational axis, wherein the remaining Hall sensor is offset toward the single circular segment-shaped permanent magnet. According to a further embodiment, the at least one circular segment-shaped permanent magnet can be polarized in the radial direction with respect to the rotational axis. According to a further embodiment, the at least one circular segment-shaped permanent magnet can be polarized in the diametric direction parallel to the sensor face of the Hall sensor in the central position. According to a further embodiment, the at least one circular segment-shaped permanent magnet can be arranged in a continuous ring made of ferromagnetic material. According to a further embodiment, the circular segment-shaped permanent magnet can be of semicircular design and is surrounded by a semicircular ring made of ferromagnetic material which extends as far as the short-circuit plane.

According to another embodiment, a method of using such a magnetic rotational angle transducer, may comprise the step of determining the angular position of a throttle valve shaft of an internal combustion engine by means of said magnetic rotational angle transducer.

BRIEF DESCRIPTION OF THE DRAWINGS

More details are given below on exemplary embodiments of the invention with reference to the appended drawings, in which:

FIG. 1 is a schematic view of a cross section through a magnetic rotational angle transducer;

FIG. 2 shows a further embodiment of a magnetic rotational angle transducer in cross section;

FIG. 3 shows the cross section from FIG. 1 and an illustration of the field line profile in the sensor with the preferred radial magnetization of the magnet;

FIG. 4 shows the rotational angle transducer from FIG. 1 with diametrically magnetized permanent magnet elements and a correspondingly modified field line profile; and FIGS. 5a-5c show schematic illustrations of the Hall sensor and its position relative to the field lines for different rotational angles.

DETAILED DESCRIPTION

Figure 5A:
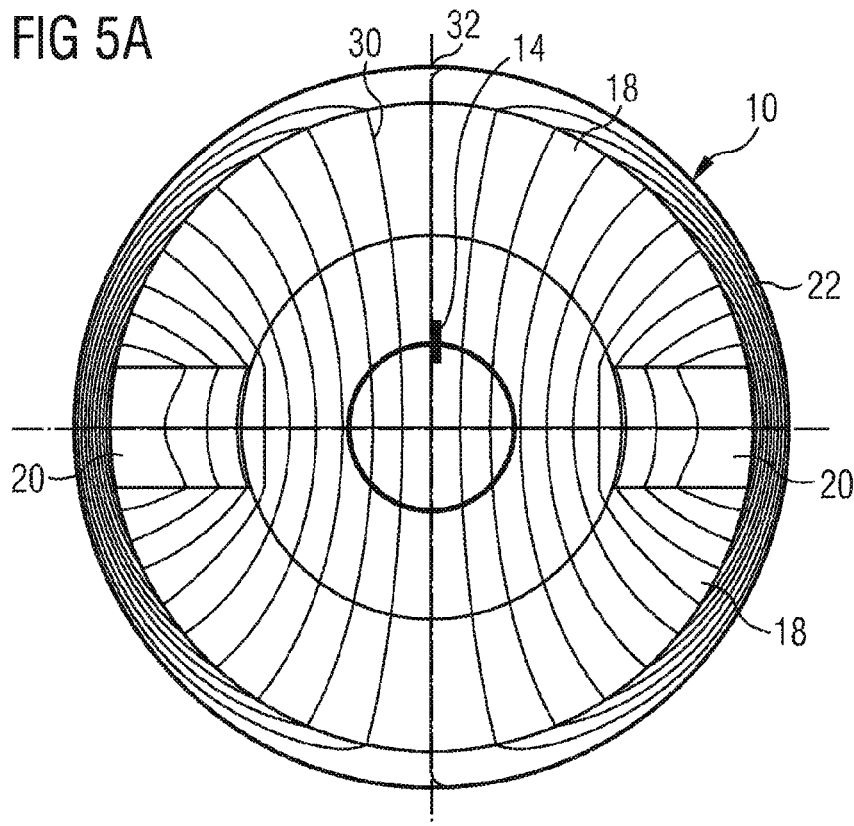

According to various embodiments, in a magnetic rotational angle transducer, the two main directions of the at least one planar Hall sensor are located radially and axially with respect to the rotational axis and in a central position parallel to the field lines of the magnetic field in this central position, and the magnetic field is formed by at least one circular segment-shaped permanent magnet which runs around the rotational axis, wherein the Hall sensor is arranged offset from the rotational axis toward the circular segment-shaped permanent magnet.

It has become apparent that the rotational angle transducer according to various embodiments provides the advantage that a linear signal output can be obtained over at least +/−60° around the zero crossover. With such output behavior it is possible to dispense with signal conditioning and, in particular, digital signal processing. Furthermore, it has become apparent that the rotational angle transducer according to various embodiments is very insensitive with respect to mechanical positional tolerances of the Hall sensor with respect to the magnetic field. Trials have shown that a displacement of 0.1 mm in the radial direction only has an effect of 0.2% on the output signal so that given the tolerances which are to be expected, for example, when assembling a throttle valve housing, no serious signal falsifications are to be expected. In addition, it has surprisingly become apparent that even displacements in the tangential direction in the region of 0.1 mm only result in faults in the previously mentioned order of magnitude in the region of the central position, which can also be considered to be insignificant. Moreover, the term circular segment-shaped when referred to the cross section of the permanent magnets, which of course has a certain depth, therefore actually has the shape of a partial hollow cylinder.

Axial displacements with respect to the rotational axis do not have any effect because of the height of the permanent magnets which are of partially cylindrical shape, provided that the displacements remain within the normal scope.

According to an embodiment, there is provision that the magnetic field is formed mirror-symmetrically around a mirror plane which is located parallel to the field lines in the central position of the Hall sensor, so that the center point of the linear measuring range is also located in the central position of the sensor. Even more preferred may be a magnetic field which is axially symmetric about the rotational axis. Such an embodiment can be obtained, for example, in that the magnetic field is formed by two maximum semicircular permanent magnets which are arranged mirror-symmetrically with respect to one another, wherein the mirror plane expediently runs through the rotational axis perpendicularly with respect to the sensor face of the Hall sensor in the central position. In each case a gap, whose walls are located, for example, parallel to one another, can be formed between the two ends of the two circular segment-shaped permanent magnets. A variant without gaps with semicircular permanent magnets is equivalent to a further embodiment with a full ring-shaped permanent magnet in terms of its magnetic properties.

The embodiment of an axially symmetric magnetic field which nevertheless brings about the desired linearization of the output signal of the Hall sensor permits a second Hall sensor to be used with an absolutely identical output behavior to that of the first sensor. This is achieved in that the first Hall sensor is offset from the rotational axis toward the first circular segment-shaped permanent magnet, and a second Hall sensor is arranged mirror-symmetrically offset from the rotational axis toward the second circular segment-shaped permanent magnet. As a result, two identical Hall sensors can each be moved in a field region with identical field properties.

If just one Hall sensor is required, according to another embodiment, there can be provision that a circular segment-shaped permanent magnet is replaced by a short-circuit plane made of ferromagnetic material which extends as far as the rotational axis, wherein the remaining Hall sensor is offset toward the single circular segment-shaped permanent magnet.

The desired embodiment of the magnetic field can be achieved with different polarization directions of the permanent magnets. It may be particularly preferred that the at least one circular segment-shaped permanent magnet is polarized in the radial direction so that, in conjunction with a further permanent magnet or a short-circuit plane, the desired field line profile is obtained. An embodiment in which the at least one circular segment-shaped permanent magnet is polarized in the diametric direction, i.e. in a basic direction parallel to the sensor face of the Hall sensor in the central position, is somewhat less favorable but is still sufficient for most applications. It is to be noted that purely radial or purely diametric magnetization of circular segment-shaped permanent magnets is virtually impossible to achieve in practice and fluid transitions between these forms of magnetization are possible.

According to yet another embodiment, there is provision that a continuous ring made of ferromagnetic material is arranged around the at least one circular segment-shaped permanent magnet. Said ring is significant both for the formation of the magnetic field within the ring shape and for shielding the system against extraneous magnetic fields which are made to pass by the measuring pickup by the outer ferromagnetic ring.

A further basic advantage of the rotational angle transducer according to various embodiments is that a relatively large magnetic volume is readily possible so that economical hard ferrites are possible as the magnetic material, which hard ferrites can easily be magnetized within a magnetic return ring. A further advantage of this method of magnetization is that after magnetization the magnets can be pre-aged by a slight "counter-magnetization pulse" in order to anticipate service life effects.

FIG. 1 shows in simplified form a magnetic rotational angle transducer 10 which has a Hall sensor 14 which is arranged on a printed circuit board 12 and whose sensor face is located at a distance from a rotational axis 16, with the two main directions of the sensor face being oriented radially and axially with respect to the rotational axis 16. The Hall sensor 14 can rotate relative to a magnetic field which is formed by two permanent magnets 18 which are arranged mirror-symmetrically with respect to one another. The two permanent magnets 18 are each embodied here in a circular segment shape in cross section, i.e. they have a partially hollow cylindrical shape. The two circular segment-shaped permanent magnets 18 each extend virtually over a semicircle, but a gap 20 remains between the respective ends of the two permanent magnets 18. The gap walls which are formed by the ends of the circular segment-shaped magnets 18 run parallel to one another.

A continuous ring 22 made of ferromagnetic material is provided around the two circular segment-shaped permanent magnets 18, said ring 22 being of lesser significance for the formation of the magnetic field within the ring shape and instead primarily shielding the system against extraneous magnetic fields which are made to pass by the measuring pickup by the outer ferromagnetic ring.

In the exemplary embodiment which is shown, the Hall sensor 14 is arranged in a stationary fashion while the magnetic wheel is connected in a rotationally fixed fashion to a shaft (not shown), in particular a throttle valve shaft, as an assembly composed of the two circular segment-shaped permanent magnets 18 and the continuous ring 22. The movement path of the Hall sensor relative to the magnetic wheel is denoted by 24 in FIG. 1. However, it is also readily possible to assign the Hall sensor to the shaft and to provide the assembly composed of the permanent magnets and the ring in a stationary fashion.

In order to provide a redundant system with two output signals which are generated independently of one another, it is possible, owing to the symmetrical configuration of the assembly composed of permanent magnets and ring 22, to arrange a second Hall sensor 26 (illustrated by dashed lines in FIG. 1) in a mirror-symmetrical fashion with respect to the first Hall sensor 14. Since a point-symmetrical magnetic field is produced about the rotational axis 16 when there are permanent magnets which are magnetized in a corresponding way to one another—more details on which will be given later—the field line pattern in the movement path of the second Hall sensor 26 also corresponds to the field line pattern in the movement path of the first Hall sensor 14, so that the two output signals are identical.

If only a single output signal is required without redundant properties of the rotational angle transducer, it is also possible to use the simplified embodiment of a rotational angle transducer 110 (shown in FIG. 2) in which half of the symmetrical assembly is replaced by a short-circuit plane 100 made of ferromagnetic material. Correspondingly, just one circular segment-shaped permanent magnet 118 is provided, but it is embodied entirely in the form of a semicircle and extends with its ends as far as the short-circuit plane 100 which runs through the rotational axis 116. Correspondingly, the outer ring 122 is also only embodied in the shape of a semicircle and ends at the short-circuit plane 100.

The elements which form the magnetic field are in turn connected in a rotationally fixed fashion to a shaft (not shown), but, due to the short-circuit plane 100, the rotational angle between the magnetic field and the Hall sensor on the movement path 124 is limited to less than 180°. In practice, this is less significant because the linearity of the output signal of the rotational angle transducer is compromised in any case toward the outermost edge regions of the rotational angle.

FIG. 3 also shows the rotational angle transducer 10 from FIG. 1, and the field lines 30 of the magnetic field are also outlined in a further illustration, in the form in which they occur when the two circular segment-shaped permanent magnets are magnetized in a radial direction with respect to the rotational axis 16. A radial direction means that one of the two poles of the permanent magnets 18 is located on the convex outer face, while the other pole may be preferably located on the concave inner face. Contrasting with this, a rotational angle transducer 10 which is identical in terms of its structural embodiment and whose permanent magnets 18 are magnetized in the diametric direction, i.e. the polarization of the circular segment-shaped permanent magnets 18 does not occur radially with respect to the rotational axis 16 but rather has a linear tendency parallel to the horizontally extending central plane, is shown in FIG. 4.

As can easily be seen by comparing the field line profiles, the field line profiles which can be achieved in practice are only approximate to the previously outlined ideal situation.

It has become apparent that much more favorable linearization of the output signal of the Hall sensor 14 can be achieved with the radial polarization direction according to FIG. 3, so that an angular range of approximately +/−60° can be achieved with a virtually linear profile. In the embodiment with diametrically magnetized permanent magnets a slightly less favorable situation occurs but the usable rotational angle range is still in a range between +/−50°, which is likewise sufficient for many applications, such as for example for a throttle valve shaft.

FIGS. 5a, b and c give details on the orientation of the field lines of the signal transmitter, shown in FIGS. 1 and 3, with respect to the active face of the Hall sensor 14. FIG. 5a shows the central position which corresponds to an angle of 0°. The field lines 30 on the central perpendicular line 32 do not have any tangential component here, i.e. the measurement signal of the pickup in the central position is equal to zero and is therefore equivalent to the zero crossover.

In the case of a magnetic field with field lines which are purely parallel to one another, a sinusoidal profile of the output signal would be produced when the Hall sensor is pivoted on a circular path to an angular position of 90°.

The selected arrangement composed of circular segment-shaped permanent magnets ultimately gives rise in the central region to a field line profile in which the distance between the field lines increases as they become more distant from the horizontal plane. This means that in the case of pivoting out of the central position, a relatively flat increase in the output signal firstly occurs. Since overall it is not possible to achieve a relatively high absolute value of the maximum output signal, this is necessary in order to have available a relatively large linear range. As the pivoting angle increases (see FIG. 5b for the 20° position and FIG. 5c for the 50° position—the magnetic wheel being rotated in the clockwise direction with respect to the stationary Hall sensor 14) it is clear that the curvature of the field lines increases progressively as the angle increases so that linearization of the output signal occurs up to a specific limiting angle above which no further linear rise can be achieved. The most extreme form of linearization, a triangular roof shape cannot be achieved with the described arrangement, but the linear signal profile over a pivoting angle of)120° (+/−60° is sufficient, for example, for the application for sensing the position of a throttle valve shaft.

Figure 5B:
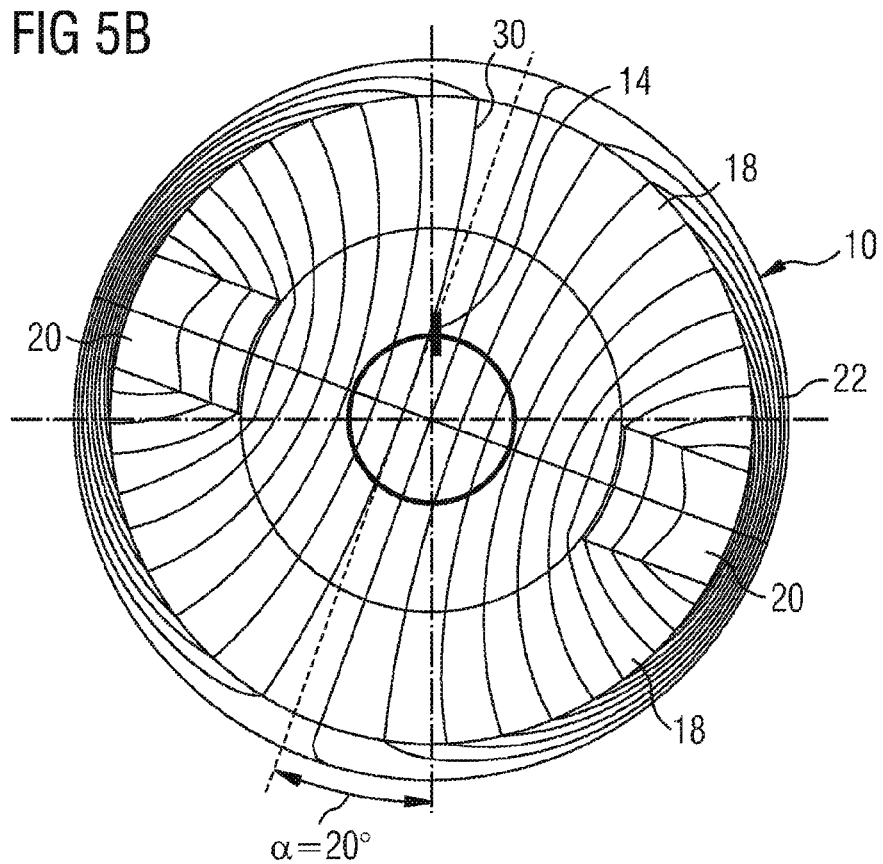

From FIGS. 5a to c it is also clear that a second Hall sensor 26 which is arranged mirror-symmetrically with respect to the first Hall sensor 14 is located in a corresponding position with respect to magnetic field lines, so that both Hall sensors can generate an absolutely identical output signal. Of course, the profiles which are shown for the field lines of the magnetic fields are achieved when the two circular segment-shaped magnet elements are magnetized opposite with respect to one another, i.e. for example with respect to FIG. 5 a-c the upper permanent magnet has its north pole, for example, on the convex outer side, while the lower permanent magnet then has its south pole on its convex outer side.

What is claimed is:

1. A magnetic rotational angle transducer, comprising:
a first and second Hall sensors which can rotate around a rotational axis, wherein the first and second Hall sensors are arranged offset with respect to the rotational axis,
a pair of circular segment-shaped permanent magnets arranged around the rotational axis for forming a magnetic field with a specific configuration, each circular segment-shaped permanent magnet having a pair of elongated curved side walls extending between a pair of end walls, each elongated curved side wall extending through an angle of less than 180 degrees between the pair of end walls,
wherein two main directions of the first and second Hall sensors, respectively are each located radially and axially with respect to the rotational axis and in a central position parallel to field lines of the magnetic field in this central position,
wherein the first Hall sensor is offset from the rotational axis toward the first circular segment-shaped permanent magnet, and the second Hall sensor is arranged mirror-symmetrically with respect to the first Hall sensor, offset from the rotational axis toward the second circular segment-shaped permanent magnet;
wherein adjacent end walls of the two circular segment-shaped permanent magnets are spaced apart from each other and define a pair of gaps, and
wherein the adjacent end walls defining each gap extend parallel to each another.

2. The magnetic rotational angle transducer according to claim 1, wherein the magnetic field is formed mirror-symmetrically around a mirror plane which is located parallel to the field lines in the central position of the first and second Hall sensors.

3. The magnetic rotational angle transducer according to claim 2, wherein the magnetic field is embodied so as to be axially symmetric about the rotational axis.

4. The magnetic rotational angle transducer according to claim 2, wherein the circular segment-shaped permanent magnets are arranged mirror-symmetrically with respect to one another or by a solid ring-shaped permanent magnet.

5. The magnetic rotational angle transducer according to claim 4, wherein the mirror plane of the two permanent magnets runs through the rotational axis perpendicularly with respect to the sensor face of the first and second Hall sensors in the central position.

6. The magnetic rotational angle transducer according to claim 1, wherein each circular segment-shaped permanent magnet is polarized in a radial direction with respect to the rotational axis.

7. The magnetic rotational angle transducer according to claim 1, wherein each circular segment-shaped permanent magnet is polarized in a diametric direction parallel to the sensor face of the first and second Hall sensors in the central position.

8. The magnetic rotational angle transducer according to claim 1, wherein each circular segment-shaped permanent magnet is arranged in a continuous ring made of ferromagnetic material.

9. A method of using a magnetic rotational angle transducer comprising:
first and second Hall sensors which can rotate around a rotational axis, wherein the first and second Hall sensors are arranged offset with respect to the rotational axis,
a pair of circular segment-shaped permanent magnets arranged around the rotational axis for forming a magnetic field with a specific configuration, each circular segment-shaped permanent magnet having a pair of elongated curved side walls extending between a pair of end walls, each elongated curved side wall extending through an angle of less than 180 degrees between the pair of end walls,
wherein two main directions of the first and second Hall sensors, respectively are each located radially and axially with respect to the rotational axis and in a central position parallel to field lines of the magnetic field in this central position,
wherein the first Hall sensor is offset from the rotational axis toward the first circular segment-shaped permanent magnet, and the second Hall sensor is arranged mirror-symmetrically with respect to the first Hall sensor, offset the rotational axis toward the second circular segment-shaped permanent magnet;
wherein adjacent end walls of the two circular segment-shaped permanent magnets are spaced apart from each other and define a pair of gaps, and
wherein the adjacent end walls defining each gap extend parallel to each another, the method comprising the step of determining the angular position of a throttle valve shaft of an internal combustion engine by means of said magnetic rotational angle transducer.

10. The method according to claim 9, wherein the magnetic field is formed mirror-symmetrically around a mirror plane which is located parallel to the field lines in the central position of the first and second Hall sensors.

11. The method according to claim 10, wherein the magnetic field is embodied so as to be axially symmetric about the rotational axis.

12. The method according to claim 10, wherein the circular segment-shaped permanent magnets are arranged mirror-symmetrically with respect to one another or by a solid ring-shaped permanent magnet.

13. The method according to claim 12, wherein the mirror plane of the two permanent magnets runs through the rotational axis perpendicularly with respect to the sensor face of the first and second Hall sensors in the central position.

* * * * *